(12) United States Patent
Baba et al.

(10) Patent No.: US 8,237,883 B2
(45) Date of Patent: Aug. 7, 2012

(54) LIQUID CRYSTAL DISPLAY DEVICE

(75) Inventors: Masashi Baba, Chiba (JP); Ikuko Imajo, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 139 days.

(21) Appl. No.: 12/730,463

(22) Filed: Mar. 24, 2010

(65) Prior Publication Data

US 2010/0245708 A1 Sep. 30, 2010

(30) Foreign Application Priority Data

Mar. 27, 2009 (JP) ................. 2009-078065

(51) Int. Cl.
*G02F 1/1333* (2006.01)

(52) U.S. Cl. .......................................... 349/58

(58) Field of Classification Search ........................ None
See application file for complete search history.

(56) References Cited

U.S. PATENT DOCUMENTS 7,903,197 B2 * 3/2011 Koganezawa .................. 349/65
8,064,006 B2 * 11/2011 Park et al. ...................... 349/58
2007/0258266 A1 11/2007 Baek et al.
2009/0109655 A1 4/2009 Shinozaki

FOREIGN PATENT DOCUMENTS

JP 2007-305584 11/2007
JP 2007-311561 11/2007

* cited by examiner

*Primary Examiner* — Sarah Hahm
(74) *Attorney, Agent, or Firm* — Antonelli, Terry, Stout & Kraus, LLP.

(57) ABSTRACT

Provided is a liquid crystal display device including a frame for accommodating light emitting diode substrates, the frame including: a first surface opposed to the light emitting diode substrates; a second surface that erects from the first surface around the light emitting diode substrates; and a third surface on an opposite side to the first surface; a connector attached to each of the light emitting diode substrates; a circuit board disposed on the third surface of the frame; and at least one cable for electrically connecting the connector with the circuit board. The at least one cable extends from the connector in a direction approaching the circuit board on the first surface so as to detour around the light emitting diode substrates, passes through the frame from the first surface to the third surface, and is electrically connected to the circuit board on the third surface.

9 Claims, 6 Drawing Sheets

LIQUID CRYSTAL DISPLAY DEVICE

CROSS-REFERENCE TO RELATED APPLICATION

The present application claims priority from Japanese application JP2009-78065 filed on Mar. 27, 2009, the content of which is hereby incorporated by reference into this application.

BACKGROUND OF THE INVENTION

1. Field of the Invention

The present invention relates to a liquid crystal display device.

2. Description of the Related Art

It has been known to use light emitting diodes as light sources for a backlight of a liquid crystal display device. For example, in a structure disclosed in each of JP 2007-305584 A (related U.S. application: US 2007/0258266) and JP 2007-311561 A (related U.S. application: US 2009/0109655), a plurality of light emitting diodes are mounted on each of a plurality of light emitting diode substrates. A connector is attached to the each of the plurality of light emitting diode substrates, and a cable is provided for establishing connection with a drive circuit. As the plurality of light emitting diode substrates are accommodated in a frame, it is concerned how to arrange the cables.

When the cables are arranged on a rear surface (surface opposite to a surface on which the light emitting diode substrates are arranged) of the frame, space for other parts to be arranged may be reduced. Further, in a case where the frame has an attachment portion for attachment with other parts, arrangement of the cables on the rear surface hinders the attachment.

SUMMARY OF THE INVENTION

The present invention has an object to arrange a cable without hindering arrangement of other parts or attachment with other parts, and therefore employs the following means.

(1) A liquid crystal display device according to the present invention includes: a liquid crystal display panel; a plurality of light emitting diode substrates each having a plurality of light emitting diodes mounted thereon; a frame for accommodating the plurality of light emitting diode substrates, the frame including: a first surface opposed to the plurality of light emitting diode substrates; a second surface that erects from the first surface around the plurality of light emitting diode substrates; and a third surface on an opposite side to the first surface; a connector attached to each of the plurality of light emitting diode substrates; a circuit board disposed on the third surface of the frame; and at least one cable for electrically connecting the connector with the circuit board, in which the at least one cable extends from the connector in a direction approaching the circuit board on the first surface so as to detour around the plurality of light emitting diode substrates, passes through the frame from the first surface to the third surface, and is electrically connected to the circuit board on the third surface. According to the present invention, at least one cable is arranged on the first surface, and hence the cable does not hinder arrangement of other parts or attachment with other parts.

(2) In the liquid crystal display device according to item (1), the plurality of light emitting diode substrates may be arranged so as to avoid an end portion of the first surface, and the at least one cable may be arranged so as to run on the end portion of the first surface.

(3) The liquid crystal display device according to item (2) may further include a reflection sheet that is disposed on the plurality of light emitting diode substrates and has a plurality of holes formed therein, each of the plurality of light emitting diodes being disposed inside each of the plurality of holes, and the reflection sheet may have a shape that extends so as to cover above the at least one cable and go over the second surface.

DETAILED DESCRIPTION OF THE INVENTION

Hereinafter, an embodiment of the present invention is described with reference to the accompanying drawings.

Figure 1:
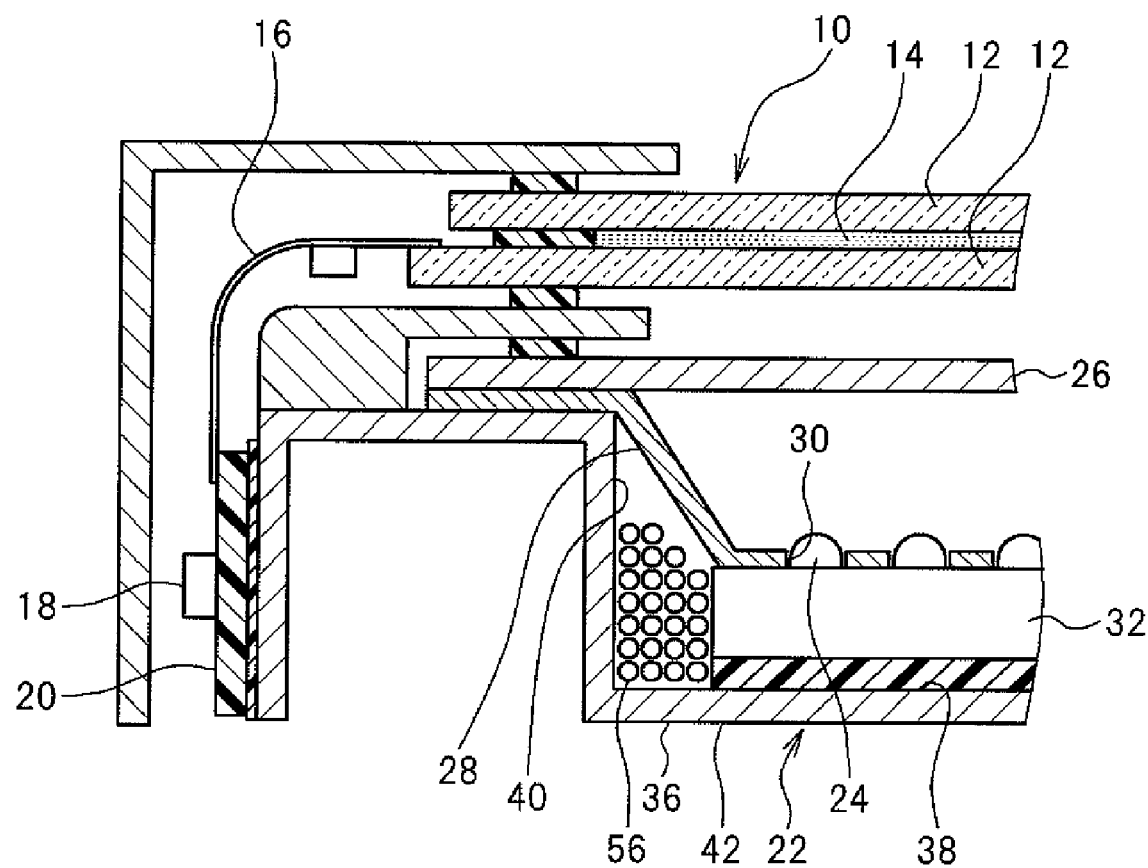
FIG. 1 is a cross sectional view illustrating a part of a liquid crystal display device according to an embodiment of the present invention.

FIG. 1 is a cross sectional view illustrating a part of a liquid crystal display device according to the embodiment of the present invention. The liquid crystal display device includes a liquid crystal display panel 10.

The liquid crystal display panel 10 includes a pair of substrates 12. Liquid crystal 14 is held between the substrates 12. One of the substrates 12 is a thin film transistor (TFT) substrate (or array substrate) including a thin film transistor, a pixel electrode, wiring, and the like. The other one of the substrates 12 is a color filter substrate. The liquid crystal display panel 10 may be driven by any mode such as in-plane switching (IPS) mode, twisted nematic (TN) mode, or vertical alignment (VA) mode. An electrode and wiring according to the adopted driving mode are formed. A flexible printed wiring board 16 is attached to the liquid crystal display panel 10. The flexible printed wiring board 16 is electrically connected to a circuit board 20 on which an integrated circuit chip 18 is mounted. The integrated circuit chip 18 has a built-in driver circuit of the liquid crystal display panel 10.

The liquid crystal display device includes a backlight 22. The backlight 22 includes a plurality of light emitting diodes 24 as light sources. A diffusion plate 26 is arranged above the light emitting diodes 24 with a space therebetween. Light emitted from the light emitting diodes 24 is diffused by the diffusion plate 26, to thereby reduce brightness unevenness.

Figure 2:
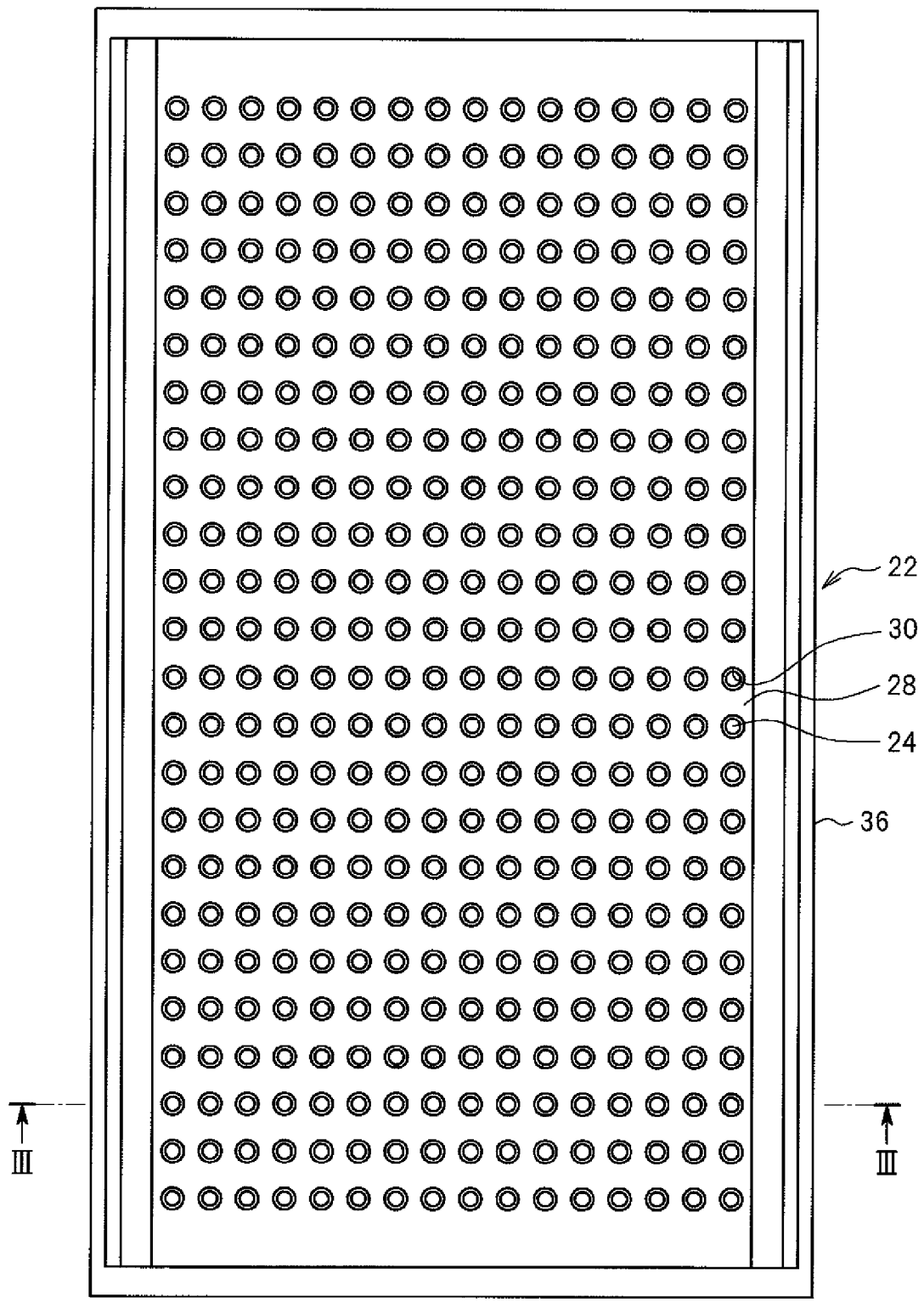
FIG. 2 is a plan view illustrating a backlight of FIG. 1 in a state where a diffusion plate is removed.
Figure 3:
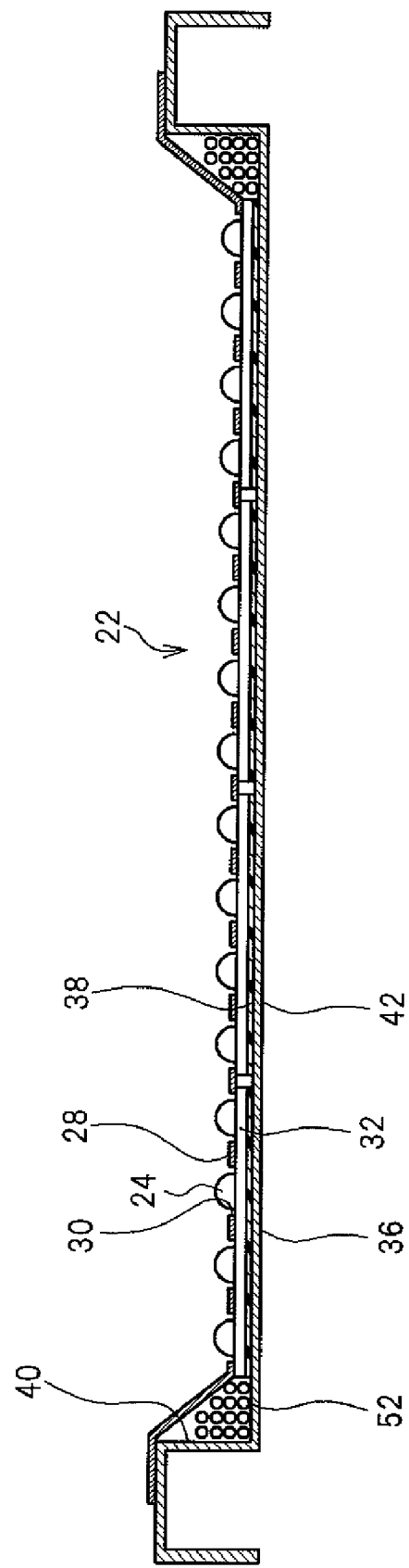
FIG. 3 is an enlarged view of a cross section taken along the line III-III in the backlight of FIG. 2.

FIG. 2 is a plan view illustrating the backlight 22 of FIG. 1 in a state where the diffusion plate 26 is removed. FIG. 3 is an enlarged view of a cross section taken along the line in the backlight 22 of FIG. 2. The backlight 22 includes a reflection sheet 28. A plurality of holes 30 are formed in the reflection sheet 28, and the plurality of light emitting diodes 24 are inserted through the plurality of holes 30, respectively. The light emitted from the light emitting diodes 24 is reflected by the reflection sheet 28.

Figure 4:
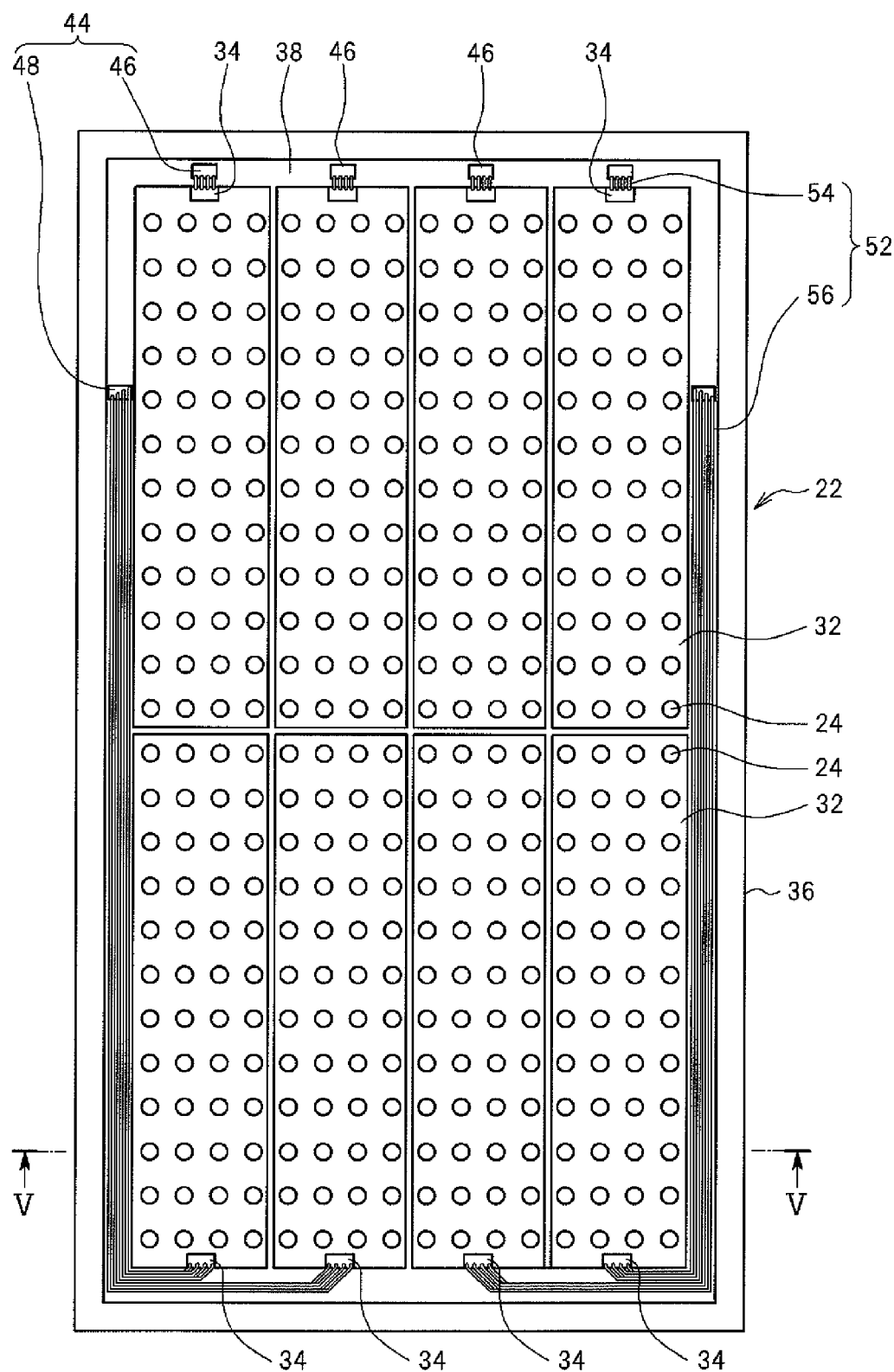
FIG. 4 is a plan view illustrating the backlight of FIG. 2 in a state where a reflection sheet is removed.
Figure 5:
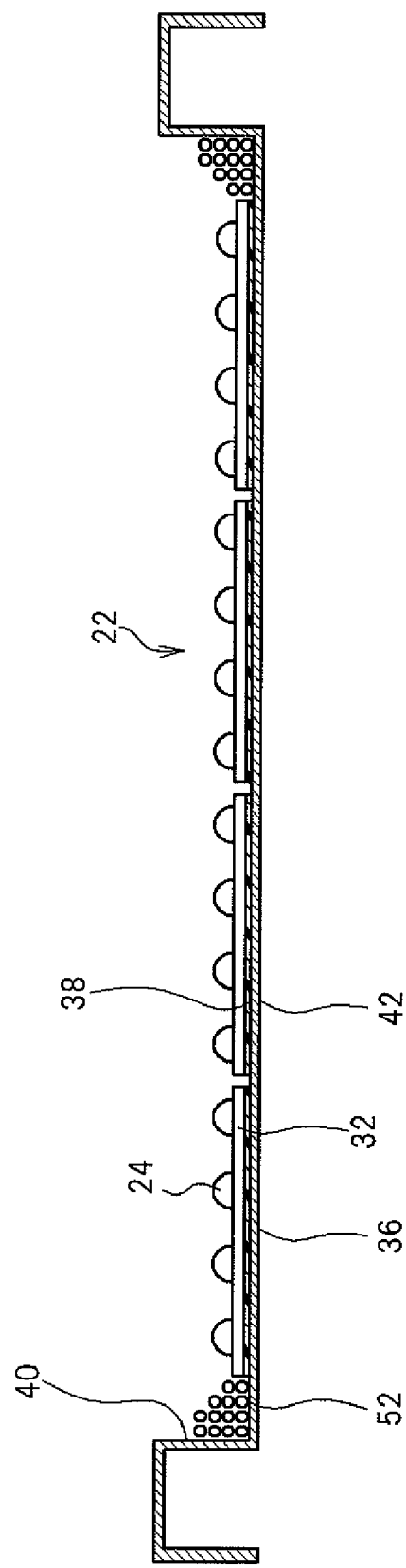
FIG. 5 is an enlarged view of a cross section taken along the line V-V in the backlight of FIG. 4.

FIG. 4 is a plan view illustrating the backlight 22 of FIG. 2 in a state where the reflection sheet 28 is removed. FIG. 5 is an enlarged view of a cross section taken along the line V-V in the backlight 22 of FIG. 4. The backlight 22 includes a plurality of light emitting diode substrates 32. The plurality of light emitting diode substrates 32 are arranged in a plurality of rows and a plurality of columns. Each of the light emitting diode substrates 32 has a rectangular flat shape. Two light emitting diode substrates 32 are arranged such that short sides thereof are opposed to each other. Further, the plurality of light emitting diode substrates 32 are arranged such that long sides of adjacent ones are opposed to each other.

The plurality of light emitting diodes 24 are mounted on each of the plurality of light emitting diode substrates 32. Brightness of the light emitting diodes 24 mounted on one light emitting diode substrate 32 is adjusted to be different from that of another light emitting diode substrate 32. Conversely, a voltage different for each light emitting diode substrate 32 may be applied according to difference in characteristics of the light emitting diodes 24 of each light emitting diode substrate 32, to thereby make uniform the brightness of the light emitting diodes 24 of all the light emitting diode substrates 32. The reflection sheet 28 (see FIG. 2) is disposed on the plurality of light emitting diode substrates 32.

A connector 34 is attached to each of the light emitting diode substrates 32. The connector 34 is electrically connected to the plurality of light emitting diodes 24 mounted on the corresponding light emitting diode substrate 32. In the example of FIG. 4, the connector 34 is attached to one end portion of the rectangular light emitting diode substrate 32 in its longitudinal direction. Further, with regard to the two light emitting diode substrates 32 having the short sides opposed to each other, the connectors 34 are attached to respective end portions thereof that are most distant from each other in the longitudinal direction.

The backlight 22 includes a frame 36. The frame 36 accommodates the plurality of light emitting diode substrates 32. The frame 36 has a first surface 38 opposed to the plurality of light emitting diode substrates 32. The light emitting diode substrates 32 are bonded to the first surface 38. The first surface 38 has a rectangular shape, and long sides of the first surface 38 are parallel to the long sides of the light emitting diode substrates 32. The plurality of light emitting diode substrates 32 are arranged so as to avoid an end portion (peripheral end portion) of the first surface 38. That is, the end portion of the first surface 38 is exposed around the plurality of light emitting diode substrates 32 even after the plurality of light emitting diode substrates 32 are bonded to the first surface 38.

The frame 36 has a second surface 40 that erects from the first surface 38 around the plurality of light emitting diode substrates 32. The second surface 40 may extend perpendicularly or obliquely with respect to the first surface 38. The reflection sheet 28 has a shape that extends from above the first surface 38 to go over the second surface 40.

Figure 6:
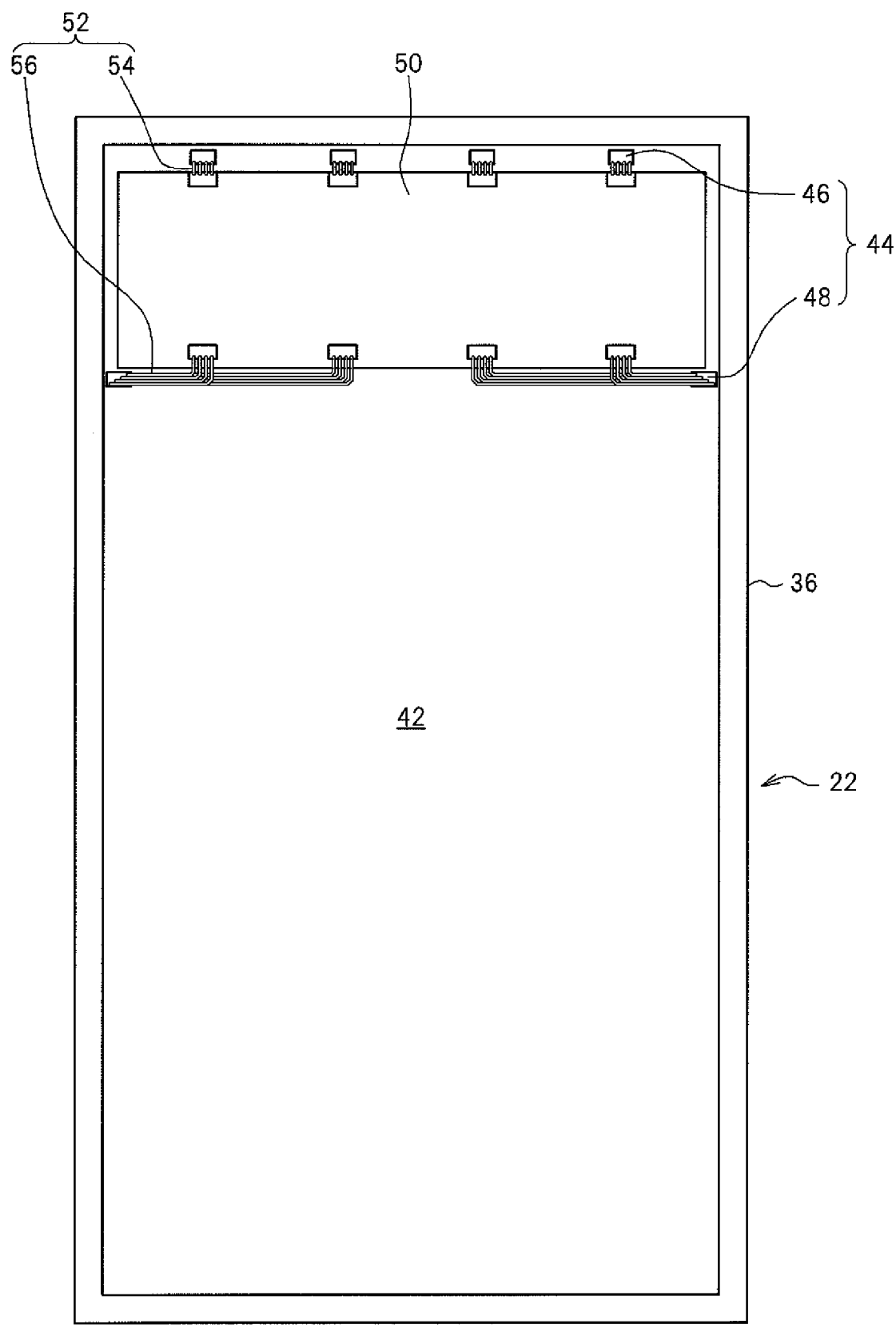
FIG. 6 is a view illustrating a bottom surface of the backlight of FIG. 4.

FIG. 6 is a view illustrating a bottom surface of the backlight 22 of FIG. 4. The frame 36 has a third surface 42 on the opposite side to the first surface 38. The third surface 42 also has a rectangular shape, and long sides of the third surface 42 are parallel to the long sides of the first surface 38. The frame 36 has through holes 44 that pass through the first surface 38 and the third surface 42. The through holes 44 are located at the end portions of the first surface 38 and the third surface 42. The through holes 44 are located so as not to be covered by the light emitting diode substrates 32.

The through holes 44 include first through holes 46 and second through holes 48. The first through holes 46 are located at the end portion of the first surface 38 or the third surface 42 on the side of a short side thereof. The second through holes 48 are located at the end portion of the first surface 38 or the third surface 42 on the side of a long side thereof. The first through holes 46 are formed next to the connectors 34 that are each attached to one (in FIG. 4, upper one) of the two light emitting diode substrates 32 having the short sides opposed to each other, whereas the first through holes 46 are not formed next to the connectors 34 that are each attached to another one (in FIG. 4, lower one) of the two light emitting diode substrates 32. Further, the second through holes 48 are formed to be located closer to the first through holes 46 with respect to the midpoint of the long sides of the first surface 38 or the third surface 42. The second through holes 48 are formed next to the one (in FIG. 4, upper one) of the two light emitting diode substrates 32 having the short sides opposed to each other, whereas the second through holes 48 are not formed next to the another one (in FIG. 4, lower one) of the two light emitting diode substrates 32.

A circuit board 50 is disposed on the third surface 42 of the frame 36 so as not to block the through holes 44. Electronic parts (not shown) for controlling the light emitting diodes 24 are mounted on the circuit board 50. The circuit board 50 is located to be closer to the through holes 44 with respect to the center of the first surface 38 or the third surface 42.

The backlight 22 includes cables 52 for electrically connecting the connectors 34 with the circuit board 50. It should be noted that the reflection sheet 28 is disposed so as to cover above the cables 52. The cables 52 include first cables 54 and second cables 56.

The first cable 54 extends from the connector 34 next to which the first through hole 46 is formed. The first cable 54 passes through the frame 36 from the first surface 38 side to the third surface 42 side via the first through hole 46 closest thereto, and is electrically connected to the circuit board 50 on the third surface 42.

The second cable 56 extends from the connector 34 in a direction approaching the circuit board 50 on the first surface 38 so as to detour around the plurality of light emitting diode substrates 32. Specifically, the second cable 56 that extends from the connector 34 next to which the first through hole 46 is not formed is arranged so as to run on the end portion of the first surface 38. The second cable 56 passes through the frame 36 from the first surface 38 side to the third surface 42 side via the second through hole 48, and is electrically connected to the circuit board 50 on the third surface 42 similarly to the first cable 54.

According to this embodiment, at least one cable 52 is arranged on the first surface 38, and hence the cable does not hinder arrangement of other parts or attachment with other parts.

The present invention is not limited to the above-mentioned embodiment, and may be variously modified. For example, the structure of the embodiment described above may be replaced by a structure that is substantially the same as that of the embodiment, a structure that provides the same action and effect as those of the embodiment, or a structure that may achieve the same object as that of the embodiment.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
a liquid crystal display panel;
a plurality of light emitting diode substrates each having a plurality of light emitting diodes mounted thereon;
a frame for accommodating the plurality of light emitting diode substrates, the frame including:
a first surface opposed to the plurality of light emitting diode substrates;
a second surface that erects from the first surface around the plurality of light emitting diode substrates; and
a third surface on an opposite side to the first surface;
a connector attached to each of the plurality of light emitting diode substrates;
a circuit board disposed on the third surface of the frame; and
at least one cable for electrically connecting the connector with the circuit board,
wherein the at least one cable extends from the connector in a direction approaching the circuit board on the first surface so as to detour around the plurality of light emitting diode substrates, passes through the frame from the first surface to the third surface, and is electrically connected to the circuit board on the third surface.

2. The liquid crystal display device according to claim 1, wherein:
the plurality of light emitting diode substrates are arranged so as to avoid an end portion of the first surface; and
the at least one cable is arranged so as to run on the end portion of the first surface.

3. The liquid crystal display device according to claim 2, further comprising a reflection sheet that is disposed on the plurality of light emitting diode substrates and has a plurality of holes formed therein, each of the plurality of light emitting diodes being disposed inside each of the plurality of holes, wherein the reflection sheet has a shape that extends so as to cover above the at least one cable and go over the second surface.

4. The liquid crystal display device according to claim 1, wherein the plurality of light emitting diode substrates are arranged adjacent one another within the frame.

5. The liquid crystal display device according to claim 4, wherein the plurality of light emitting diode substrates are arranged in a plurality of rows and a plurality of columns.

6. The liquid crystal display device according to claim 4, wherein each of the plurality of light emitting diode substrates has a rectangular flat shape, and two of the plurality of light emitting diode substrates are arranged such that short sides thereof are opposed to each other.

7. The liquid crystal display device according to claim 4, wherein each of the plurality of light emitting diode substrates has a rectangular flat shape, and the plurality of light emitting diode substrates are arranged such that long sides of adjacent ones are opposed to each other.

8. The liquid crystal display device according to claim 4, wherein:
each of the plurality of light emitting diode substrates has a rectangular flat shape;
two of the plurality of light emitting diode substrates are arranged such that short sides thereof are opposed to each other; and
the plurality of light emitting diode substrates are arranged such that long sides of adjacent ones are opposed to each other.

9. The liquid crystal display device according to claim 4, wherein the plurality of light emitting diode substrates lie in one plane, and the first surface of the frame lies in a plane which is substantially parallel to the one plane.

* * * * *